(12) United States Patent
Patel et al.

(10) Patent No.: US 8,407,893 B2
(45) Date of Patent: Apr. 2, 2013

(54) METHOD OF REPAIRING A GAS TURBINE ENGINE COMBUSTOR

(75) Inventors: Bhawan B. Patel, Mississauga (CA); Lorin Markarian, Etobicoke (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 13/183,928

(22) Filed: Jul. 15, 2011

(65) Prior Publication Data

US 2011/0271528 A1 Nov. 10, 2011

Related U.S. Application Data

(62) Division of application No. 12/201,404, filed on Aug. 29, 2008, now Pat. No. 8,001,793.

(51) Int. Cl.
*B21D 53/00* (2006.01)

(52) U.S. Cl. .................................. 29/890.01; 60/754

(58) Field of Classification Search ............ 29/889.1, 29/890.01
See application file for complete search history.

(56) References Cited

U.S. PATENT DOCUMENTS

| | | | |
|---|---|---|---|
| 5,323,602 A | 6/1994 | Defever | |
| 5,758,504 A | 6/1998 | Abreu et al. | |
| 6,155,056 A | 12/2000 | Sampath et al. | |
| 6,345,441 B1 * | 2/2002 | Farmer et al. | 29/889.1 |
| 6,568,187 B1 | 5/2003 | Jorgensen et al. | |
| 6,640,547 B2 | 11/2003 | Leahy, Jr. | |
| 6,955,053 B1 | 10/2005 | Chen et al. | |
| 7,124,487 B2 * | 10/2006 | Kuhn et al. | 29/401.1 |
| 7,134,286 B2 | 11/2006 | Markarian et al. | |
| 7,140,189 B2 | 11/2006 | Markarian et al. | |
| 7,146,816 B2 | 12/2006 | Anderson et al. | |
| 7,260,936 B2 | 8/2007 | Patel et al. | |
| 7,269,958 B2 | 9/2007 | Stastny et al. | |
| 7,308,794 B2 | 12/2007 | Morenko et al. | |
| 7,350,358 B2 | 4/2008 | Patel et al. | |
| 2005/0050896 A1 * | 3/2005 | McMasters | 60/748 |
| 2006/0016191 A1 | 1/2006 | Woodcock et al. | |
| 2006/0042271 A1 | 3/2006 | Morenko et al. | |
| 2006/0272335 A1 | 12/2006 | Schumacher et al. | |
| 2006/0277921 A1 | 12/2006 | Patel et al. | |
| 2007/0006588 A1 | 1/2007 | Patel et al. | |
| 2007/0234727 A1 | 10/2007 | Patel et al. | |
| 2008/0016874 A1 | 1/2008 | Markarian et al. | |
| 2008/0104962 A1 | 5/2008 | Patel et al. | |
| 2008/0115498 A1 | 5/2008 | Patel et al. | |
| 2008/0115499 A1 | 5/2008 | Patel et al. | |
| 2008/0115506 A1 | 5/2008 | Patel et al. | |
| 2008/0148738 A1 | 6/2008 | Rudrapatna et al. | |
| 2008/0178599 A1 | 7/2008 | Hawie et al. | |
| 2008/0256955 A1 | 10/2008 | Parkman et al. | |
| 2009/0000303 A1 | 1/2009 | Patel et al. | |

\* cited by examiner

*Primary Examiner* — David Bryant
*Assistant Examiner* — Moshe Wilensky
(74) *Attorney, Agent, or Firm* — Norton Rose Canada LLP

(57) ABSTRACT

A method of repairing an annular sheet metal combustor liner of a gas turbine engine includes cutting circumferentially around combustor liner bands bounding an effusion patch extending circumferentially around the liner, the effusion patch having effusion cooling holes and being bounded on either side by at least one effusionless band free from effusion cooling holes, to thereby remove a portion of the combustor liner having the effusion patch. A replacement liner portion including an effusion patch is provided and welded to the liner assembly, the weld extending circumferentially around the cut band to provide a welded effusionless band. The welded effusionless bands is cooled during engine use using one of film cooling of an inner surface of the welded effusionless band and impingement cooling of an outer surface of the welded effusionless band.

8 Claims, 2 Drawing Sheets

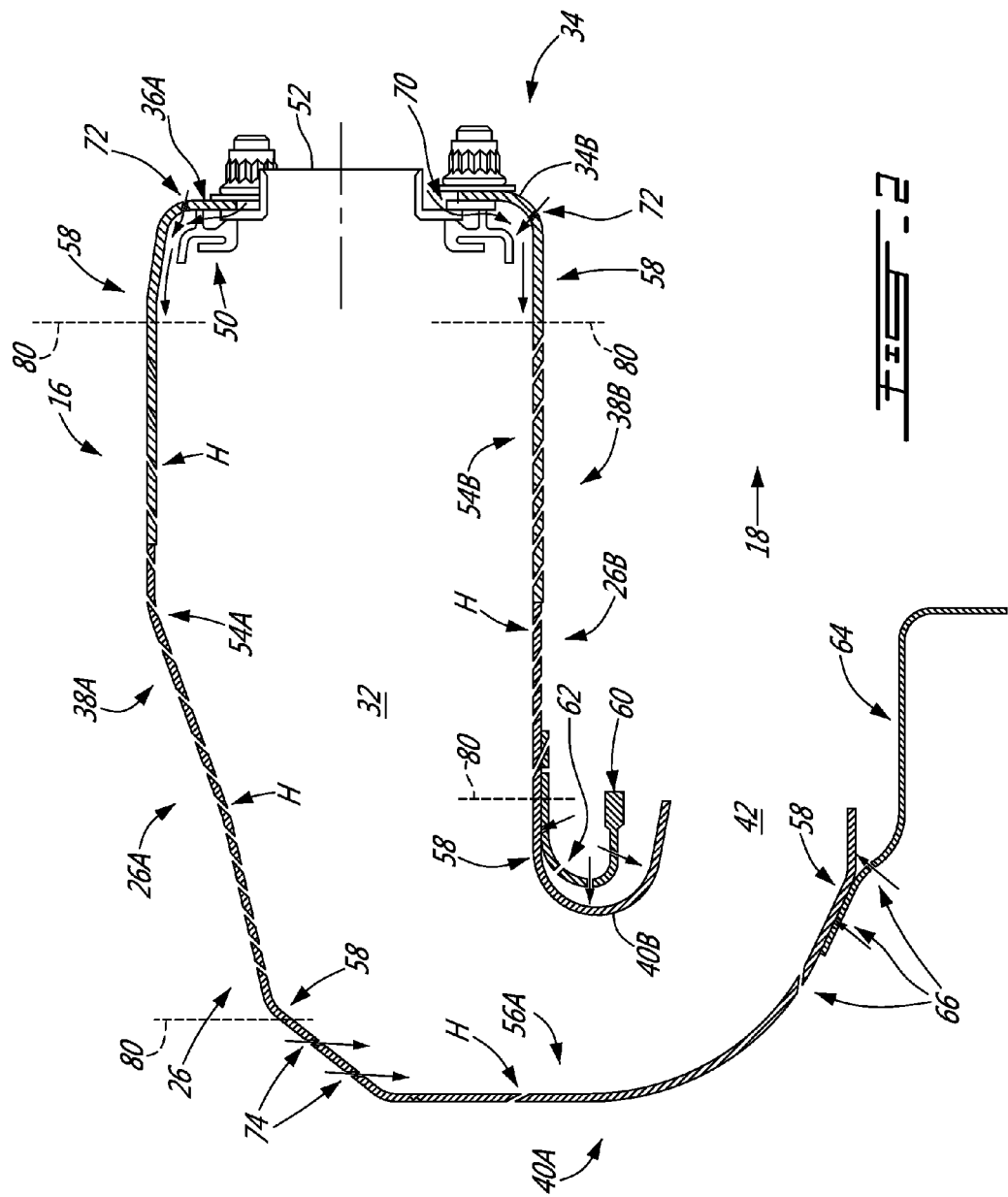

METHOD OF REPAIRING A GAS TURBINE ENGINE COMBUSTOR

CROSS-REFERENCE TO RELATED APPLICATIONS

The present application is a divisional of U.S. patent application Ser. No. 12/201,404 filed Aug. 29, 2008 now U.S. Pat. No. 8,001,793, the entire contents of which is incorporated herein by reference.

TECHNICAL FIELD

The present application relates to gas turbine engine combustors and, more particularly, to cooling such combustors.

BACKGROUND

A combustor with effusion-cooled panels coated with a thermal barrier coating is difficult to repair. A typical effusion-cooled combustor has tens of thousand of holes regularly spaced over the area to be cooled. In manufacture, the panels are made by first coating the metal with the thermal barrier coating, and then drilling the effusion cooling holes. This approach ensures the holes are not blocked by thermal barrier coating, as the holes diameters are typically quite small. When this combustor goes to repair, it is difficult to cut out a patch, because the holes are so closely spaced together that one cannot cut between them, thus necessitating that large panels need to be replaced all at once, even though only a small portion may need repair. Replacing large panels is costly. U.S. Pat. No. 7,124,487 discloses a method for making modular effusion panel subassemblies remote from the combustor liner, removing a damaged panel from the combustor liner, and replacing the non-effusion or damaged panel with the modular effusion panel. Room for improvement exists.

SUMMARY

In one aspect, provided is a reverse flow combustor for an aircraft gas turbine engine, the combustor comprising: a generally axially-extending annular combustion chamber, the chamber provided between co-operating inner and outer liners, each liner being a single piece of sheet metal, the single piece of sheet metal extending from a radially extending flat dome portion through an axially extending cylindrical portion to a U-shaped exit duct portion, the liners mating to provide a liner assembly having a dome and an exit, the dome provided by overlapping flat dome portions of the inner and outer liners, the dome including a plurality of fuel nozzle openings, each sheet metal liner being louverless and thereby having a smooth and continuous inner surface along its length from dome to exit, the inner and outer liner each having an annular ring mounted to an outer side adjacent the liner assembly exit, the rings configured for connection of the liner assembly to the gas turbine engine; a dome heat shield assembly mounted inside the combustion chamber to the dome and spaced apart from the dome to provide a plenum between the heat shield and the dome, the combustor otherwise being heat shield-less, the dome heat shield assembly including a plurality of fuel nozzle openings aligning with the fuel nozzle openings of the dome; and a thermal barrier coating applied to at least a portion of the inner surface of each liner, wherein the liner assembly further includes a plurality of effusion patches, each patch having a plurality of effusion cooling holes provided at an acute angle through the liner, the effusion holes provided in a plurality of axially spaced rows extending around the liner circumference, each effusion patch extending around the circumference of its respective liner, each effusion patch bounded on both of its axial sides by an effusionless band, each effusionless band being a portion of the liner sheet metal which is free from effusion cooling holes, wherein a first said effusionless band is provided on each liner on the axially extending cylindrical portion immediately adjacent the radially extending flat dome portion, the first effusionless band being cooled by a film cooling jet fed from a first and a second source upstream of the of the band, the first source being at least one aperture through the heat shield feeding the plenum, the second source being a plurality of apertures provided through the radially extending flat dome portion feeding the plenum, the first and second sources sized to provide adequate an film cooling flow over a complete length of the first effusionless band, the heat shield and liner co-operating to direct cooling air from the plenum top provide the film cooling jet over the first effusionless band, and wherein a second said effusionless band provided on each liner adjacent its exit end, the band provided in an at least partially overlapping relationship with a respective on of said mounting rings, the rings having a plurality of impingement holes therethrough to permit impingement cooling of the outer side of the liner at said effusionless band.

In another aspect, provided is a method of repairing an annular sheet metal combustor liner of a gas turbine engine, comprising: obtaining a combustor liner having a central portion with an effusion patch extending circumferentially all around the liner, the effusion patch having effusion cooling holes covering substantially the entire patch, the effusion patch bounded on either side by at least one effusionless band free from effusion cooling holes, each band extending circumferentially all around the liner, the effusionless patches cooled using one of film cooling of an inner surface and impingement of an outer surface, the method comprising the steps of: cutting circumferentially around the combustor liner bands bounding the effusion patch to thereby remove a portion of the combustor liner having the effusion patch, the removed portion including a portion of said bands bounding the effusion patch; providing a replacement liner portion including an effusion patch and at least a portion of an effusionless band bounding both sides of the effusion patch; welding the replacement liner portion to the liner assembly, the weld extending circumferentially around the cut band to provide a welded effusionless band; and cooling the welded effusionless bands during engine use using one of film cooling of an inner surface of the welded effusionless band and impingement cooling of an outer surface of the welded effusionless band.

These and other aspects of the present approach will become apparent through the present description, including the appended figures.

BRIEF DESCRIPTION OF DRAWINGS

FIG. 2 shows a schematic of the present combustor.

DESCRIPTION

Figure 1:
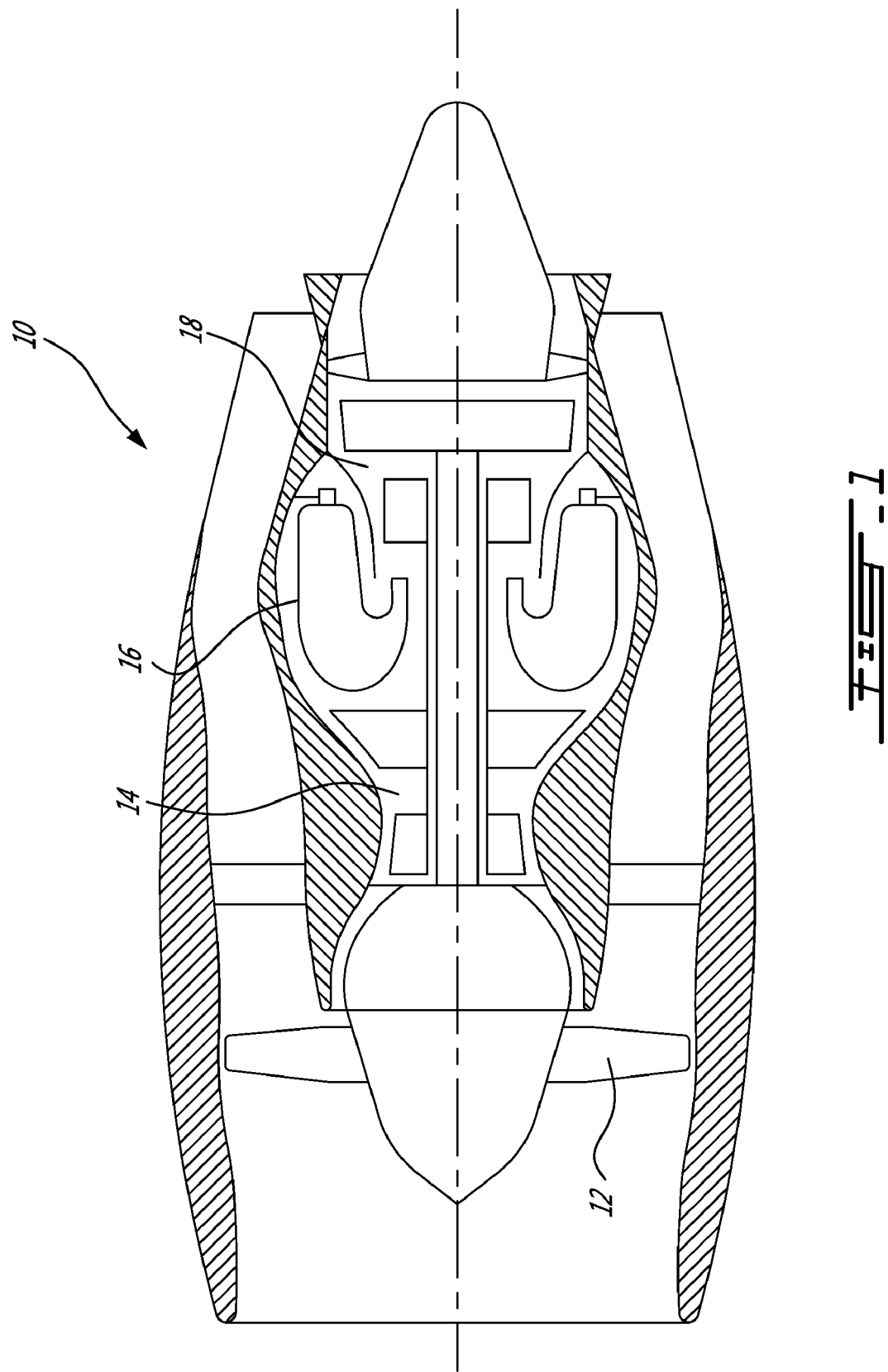
FIG. 1 shows a schematic of a turbofan engine.

FIG. 1 illustrates a gas turbine engine 10 preferably of a type provided for use in subsonic flight, generally comprising in serial flow communication a fan 12 through which ambient air is propelled, a multistage compressor 14 for pressurizing the air, an annular combustor 16 in which compressed air is mixed with fuel and ignited for generating an annular stream of hot combustion gases which is then redirected by combustor 16 to a turbine section 18 for extracting energy from the combustion gases.

Referring to FIG. 2, the reverse-flow combustor 16 comprises generally a liner 26 composed of an outer liner 26A and an inner liner 26B defining a combustion chamber 32 therein. Combustor 16 has a generally flat dome 34 comprised of overlapping portions of the outer and inner liners. Outer liner 26A includes an outer dome panel portion 34A, a cylindrical body panel portion 38A, long exit duct portion 40A, while inner liner 26B includes an inner dome panel portion 34B, a cylindrical body panel portion 38B, and a small exit duct portion 40B. The exit ducts 40A and 40B together define a combustor exit 42 for communicating with turbine section 18.

A dome heat shield 50 is mounted downstream of and spaced apart from the dome 34. The dome and heat shield each include respective openings for insertion of fuel nozzles (not shown) and a floating collar 52 into the combustor. Means for admitting cooling air into the combustor behind the heat shield (i.e. between the dome and the heat shield) are also provided, as will be described in further detail below.

The combustor liners 26A/2B are each a single piece of sheet metal and each have a louverless design, i.e. the inner surface of the liners is a smooth, continuous surface from outer dome panel portion 34A/34B to exit duct portion 40A/40B. The inner surface of the liners 26A and 26B are coated with a suitable thermal barrier coating. Although such a louverless sheet metal design is attractive from a manufacturing and cost perspective, it presents special cooling problems which must be addressed.

Liners 26A and 26B include effusion cooled patches 54A, and 54B, respectively Effusion cooling holes H are angled generally downstream, at an acute angle relative to the liner wall, and have diameter of 0.010-0.030", a hole-to-hole spacing within a row of between 0.075-0.100 (between holes centres), and have a row-to-row spacing of between 0.075-0.100 (between holes centres). The holes of adjacent rows of holes may be positioned to be offset or staggered. The number of rows on the outer liner may be in the range of 17 to 20 rows, or more, while the number of rows on the inner liner may be between 13 to 15, or more.

The effusion patches are provided in such a way that a circumferential section of the outer and/or inner combustor liners can be replaced by removing a section. For example, an effusionless liner band 58 is provided on each of the inner and outer liners, around the dome and between the effusion patch and the dome, the band being without any effusion holes to thereby help with the repair process close to the dome. This provides space for the inner and outer panels to be separated from the dome panel without damaging the effusion patches. These effusionless bands also provide space for a repair detail, such as a replacement panel, to be reconnected to the dome, and thus replacement of the dome is not required when the inner and/or outer panels are replaced.

The effusionless band has sufficient width the allow the described cutting and re-welding operations. In one example, the band adjacent the dome is centred between 0.35-0.5" from the radially-extending dome portion of the liner, the band therefore has a width of twice that distance, or about 0.70-1.0". Since row-to-row spacing may be in the range of 0.075-0.100 (between holes centres), this means the effusionless band adjacent the dome may have a width of between 5 and 10 times the row-to-row spacing in the effusion patch adjacent to the band.

Another effusionless liner band 58 is provided between the cylindrical section 38A/B and the exit duct portions 40A/B. Effusionless bands 58 are thus provided on either side of the cylindrical sections 38A/B.

The cylindrical sections 38A/B which contain the effusion patches 54A/B can thus cut, removed and replaced by a replacement liner portion having effusion patches. This is accomplished, for example, by circumferentially cutting around the combustor liner along cut lines 80 as shown in FIG. 2, through the effusionless bands 58 which bound either side of the effusion patches 54A, 54B. This replacement liner portion may include, for example, a sheet metal rolled section which creates the cylinder, wherein a thermal barrier coating is applied to the combustor's inner surface, and an effusion patch is re-drilled. The replacement liner portion is then reattached, typically by welding along the cut line points 80, to the remaining combustor.

The large exit duct portion 40A of the outer liner also includes an effusion patch 56A. The large exit duct (LED) cooling scheme pattern consists of between 5 and 7 rows of effusion holes with relatively large axial gaps for circumferential weld. In particular, in addition to band 58, another effusionless band 58 is provided near the exit of large exit duct portion 40A. Effusionless bands 58 are thus provided on either side of the large exit duct portion 40A.

Providing such effusionless bands, however, presents cooling problems, since the absence of effusion cooling holes in the bands means that the bands are susceptible to developing hot spots which may lead to a degradation of the combustor's life and/or performance. Accordingly, in accordance with the present design, the effusionless bands are specifically targeted with cooling measures designed to ensure the effusionless bands are adequately cooled.

As previously mentioned, sheet metal louverless combustors, for all their good qualities, present unique cooling problems to the designer, since many/most of the cooling features used in prior art machined combustors, such a louvers, V-bands, and so on, are (by definition) not available on a simple sheet metal combustor, and therefore how such bands may be cooled presents a particular problem to the designer.

In the present design, the effusionless bands at the dome end are cooled by film cooling, as indicated by the airflow arrows in FIG. 2. Film cooling at the dome end is achieved through holes 70 in the heat shield that aid with the cooling, as well as the holes 72 in the dome portion of the liner. Although film cooling is sometimes provided in these locations for the purposes of film cooling the dome itself or rear face of the heat shield, or perhaps region of the outer/inner liner in close proximity therewith, such film cooling does not extend in effect beyond these features, because the coolant flow is tailor to be as little as possible, so as not to "waste" cooling air, or over-cool the liner. In this design, however, additional film cooling (provided either through increased hole density or increased hole diameter, or both) is provided so that the film cooling effect extends well beyond the dome/heat shield portion, so that film cooling is also effective through the entire regions of these bands 58 to provide sufficient cooling to the bands.

The effusionless band adjacent the small exit duct is impingement cooled, by impinging air on band and adjacent portions of the liner, as indicated by the airflow arrows in FIG. 2. Access to the liner is nominally blocked by the SED mounting ring 60, and hence 4 to 5 rows of cooling holes 62 may be provided through the ring to permit cooling air to pass through the ring to impinge upon the liner in this region.

Similarly, the effusionless band adjacent the large exit duct is impingement cooled, by impinging air on band and adjacent portions of the liner, as indicated by the airflow arrows in FIG. 2. Access to the liner is nominally blocked by the LED mounting ring 64, and hence 3 rows of cooling holes 66 may be provided through the ring to permit cooling air to pass through the ring to impinge upon the liner in this region.

The effusionless band on the outer liner, between the cylindrical section 38A and the large exit duct 40A, is cooled by film cooling, the film cooling air admitted through film cooling holes 74 provided in region which admit jets of air into the combustor generally parallel to the downstream portion of the large exit duct, as indicated by the airflow arrows in FIG. 2. Some of this film cooling air is also carried along the large exit duct to augment cooling provided to the effusionless band adjacent the large exit duct exit.

As discussed above, the combustor is repair-friendly, because its design facilitates section removal and replacement, using the operations of cutting and re-welding of a repair detail in place. It will be understood that the above-described cooling schemes will not only provides for improved durability of the effusionless band portions of the original combustor, but such cooling will also improve the durability of any such repair, since the cooling scheme may be used to cooled the welds provided in the effusionless bands. Therefore, the present concept includes not only an improved combustor design, but also an improved method of repair which allows a repaired area to take advantage of cooling air to enhance the durability of the repair. Such factors may affect the design of the repair itself, for example, by permitting use of a repair scheme or parameters which would not be available in a uncooled environment such as has been present in the prior art.

While the present concepts have been described with reference to example embodiments, it will be understood by those skilled in the art that various changes may be made and equivalents may be substituted for elements thereof without departing from the scope of the inventions disclosed. Therefore, it is intended that any inventions not be limited to the particular embodiment disclosed as the best modes contemplated for carrying out this invention, but rather will include all embodiments falling within the scope of the appended claims.

The invention claimed is:

1. A method of repairing an annular sheet metal combustor liner of a gas turbine engine, comprising:
    obtaining a combustor liner having a central portion with an effusion patch extending circumferentially all around the liner, the effusion patch having effusion cooling holes covering substantially the entire patch, the effusion patch bounded on either side by at least one effusionless band free from effusion cooling holes, each band extending circumferentially all around the liner, the effusionless patches cooled using one of film cooling of an inner surface and impingement of an outer surface:
    cutting circumferentially around the combustor liner bands bounding the effusion patch to thereby remove a portion of the combustor liner having the effusion patch, the removed portion including a portion of said bands bounding the effusion patch;
    providing a replacement liner portion including an effusion patch and at least a portion of an effusionless band bounding both sides of the effusion patch;
    welding the replacement liner portion to the liner assembly, the weld extending circumferentially around the cut band to provide a welded effusionless band; and
    providing a second one of said effusionless band on each of the inner and outer liners adjacent exit ends thereof, the second of the effusionless band being provided in an at least partially overlapping relationship with a respective one of rings mounted to an outer side of the combustor liner adjacent the exit thereof for connection of the combustor liner to a gas turbine engine, the rings having a plurality of impingement holes therethrough to permit impingement cooling of the outer side of the combustor liner at the second one of said effusionless band.

2. The method of claim 1 wherein the replacement liner portion is an outer liner portion having at least 17 rows of effusion holes in the effusion patch.

3. The method of claim 1 wherein the replacement liner portion is an inner liner portion having at least 13 rows of effusion holes in the effusion patch.

4. The method of claim 1 further comprising passing air through a mounting ring adjacent the welded effusionless band to provide said impingement cooling of an outer surface of the welded effusionless band.

5. The method of claim 1, further comprising applying a thermal barrier coating to at least a portion of the inner surface of the liner.

6. The method of claim 1, wherein the annular sheet metal combustor liner defines a generally axially-extending annular combustion chamber, the chamber provided between co-operating inner and outer liners, and further comprising forming each of the inner and outer liners out a single piece of sheet metal.

7. The method of claim 1, further comprising providing a first one of said effusionless band on an axially extending cylindrical portion of the combustor liner immediately adjacent a radially extending flat dome portion thereof.

8. The method of claim 7, further comprising providing the first one of said effusionless band on each of inner and outer liners co-operating to define the annular combustion chamber.

* * * * *